3,629,189
ENHANCEMENT OF RESISTANCE OF OLEFIN POLYMERS TO COPPER-CATALYZED OXIDATIVE DEGRADATION
Motonobu Minagawa, Koshigaya, and Kenichi Nakagawa, Tokyo, Japan, assignors to Argus Chemical Corporation, Brooklyn, N.Y.
No Drawing. Filed May 27, 1969, Ser. No. 828,365
Claims priority, application Japan, May 30, 1968, 43/36,929
Int. Cl. C08f 45/60
U.S. Cl. 260—23
14 Claims

ABSTRACT OF THE DISCLOSURE

Heterocyclic hydrazines and lactams are provided which are useful in the enhancement of the resistance of olefin polymers to copper-catalyzed oxidative deterioration.

In addition, there are also provided stabilizer compositions consisting essentially of at least one olefin polymer stabilizer and heterocyclic hydrazines or lactams; olefin polymer compositions, such as propylene polymer compositions, containing heterocyclic hydrazines or lactams; and a process for enhancing the resistance of olefin polymers to copper-catalyzed degradation by incorporation of such compounds or of such stabilizer compositions.

---

This invention relates to novel heterocyclic hydrazines and lactams, which are useful in the enhancement of the resistance of olefin polymers, such as propylene polymers, to copper-catalyzed oxidative deterioration; to stabilizer compositions consisting essentially of at least one olefin polymer stabilizer, and heterocyclic hydrazines and lactams; and to olefin polymer compositions having an enhanced resistance to copper-catalyzed degradation in physical properties due to incorporation therein of such compounds or stabilizer compositions; and to a process of enhancing the resistance of elefin polymers to copper-catalyzed degradation by incorporation of such compounds or stabilizer compositions.

Polypropylene is a tough, hard, relatively flexible, high-melting polymeric material, and thus has a number of important applications, such as, for example, as electrical insulation for copper wires and cables. However, in several respects the stability of polypropylene leaves much to be desired. The polymer shows a tendency to decrease rapidly in melt viscosity and then to become brittle when kept at elevated temperatures for the time required in milling, calendering, extrusion, injection molding, and fiber-forming equipment. This deterioration is particularly serious when the polymers are worked in a molten state in the presence of oxygen, for example, air. It is known in the art that degradation in one or more physical properties of polypropylene due to heat can be inhibited by the incorporation of a number of well known thermal antioxidants, including hindered phenols, secondary aromatic amines, organic phosphites, and thiodipropionic acid esters.

A special problem is presented when the polypropylene is contaminated by or is used in contact with copper. Thus, polypropylene employed as insulation for copper wires and cables becomes useless after a few months. In fact, it has been found that oxidative degradation of polypropylene occurs at an extremely rapid rate in the presence of copper, even when the polymer contains effective antioxidants. Hansen et al., Journal of Polymer Science, Part A, 2, 587–609 (1964), report at page 589 that "The catalytic effect of copper on the thermal oxidation of polypropylene is not as drastic in the *absence* of antioxidants as it is in their presence" (emphasis added).

Where polypropylene contains an antioxidant, in the presence of copper "the rate of oxidation becomes rapid and constant after a drastically shortened induction period compared with that obtained in the absence of copper" (page 590). "The induction period in oxygen at 140° C. for polypropylene stabilized by the addition of 0.5 weight percent of 4,4'-thiobis(3-methyl-6-tert-butylphenol) is decreased from about 400 hours to 40 hours by the presence of copper. Similar 90% losses in the effectiveness of this antioxidant in the presence of copper have been observed over a range of temperatures" (page 591).

To inhibit copper-catalyzed oxidation, conventional copper chelating agents and metal deactivators have been added to polypropylene compositions containing thermal antioxidants. As reported by Hansen et al., supra, at page 593, "All of these materials were found to be unsatisfactory for a variety of reasons. Most of them did not diminish the catalytic activity of copper and copper compounds. Some actually accelerated the already rapid copper-catalyzed oxidation of polypropylene, and might be useful in other reactions where oxidation is sought rather than avoided. The best of the conventional deactivators (for example, N,N'-di-β-naphthyl-p-phenylenediamine) were only slightly effective in curtailing the catalytic activity of copper." It is also reported that other conventional and commercial metal inhibitors or deactivators, such as ethylenediamine tetraacetic acid and its salts, 2,2'-bipyridyl, 8-quinolinol, N,N'-disalicylidene-1,2-propanediamine, and benzimidazole, either were ineffective or only slightly effective, and usually had other disadvantages, including instability, incompatibility, water-solubility, volatility, formation of highly colored products, and reaction with other components of the polypropylene composition.

A number of compounds have been suggested, for use in suppressing copper-catalyzed oxidation of polypropylene. Hansen et al., supra, and British Pat. No. 974,274, to Western Electric Company, Inc., recommend oxamide and compounds derived from oxamide which contain the radical

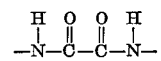

for inhibiting copper-catalyzed oxidation of polypropylene. Hansen et al. report that polypropylene compositions containing 0.5% by weight antioxidant and 0.5% by weight oxamide or substituted oxamide retained between 30 to 80% of the effectiveness of the antioxidant in the presence of copper, while when oxamide or its derivatives were not used, only between 1 and about 15% of the normal induction period for an antioxidant was observed.

Hansen et al., Polymer Engineering and Science, vol. 5, October 1965, pages 223 to 226, reported the nitrobenzohydrazides, oxalyldihydrazide and its derivatives, triazines, triazoles, triazolines, and tetrazoles, are effective copper inhibitors. However, many of these compounds destroy the effectiveness of antioxidants, such as N-phenyl-2-naphthylamine, 4,4'-thiobis(3-methyl-6-tertiary-butylphenol) and 6,6'-di-tert-butyl-4,4'-bis-o-cresol.

A number of other compounds which are apparently useful as copper deactivators and inhibit copper-catalyzed oxidation of polypropylene are known. U.S. Patent No. 3,110,696 to Dexter discloses compounds of the formula

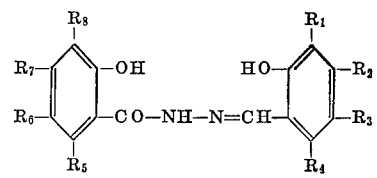

wherein the R radicals are hydrogen, alkyl, alkoxy or phenyl. Dexter prefers N'-salicylidene-N'-salicylhydrazide.

U.S. Patent No. 3,117,104 to Bown et al. discloses oxaldihydrazides having the formula

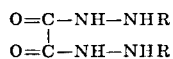

where R is an alkyl of up to sixteen carbon atoms, monoaryl or naphthenyl, having from five to twelve carbon atoms. Such compounds are shown to reduce the stabilizing effectiveness of dilauryl thiodipropionate in the presence of copper by about 75%.

British Patent No. 994,116 to Shell teaches that stabilizer combinations which contain (a) an organic sulfur compound of the type $R_1-S_xR_2$, wherein $x$ is an integer of up to 2 and $R_1$ and $R_2$ are alkyl, aralkyl, or cycloalkyl, having from eight to twenty-five carbon atoms and (b) a polynuclear polyphenol consisting of a benzene ring substituted with $n$ 3,5-dialkyl-4-hydroxybenzyl groups wherein $n$ is 3 or 4, are effective in protecting alkene polymers, prepared by a low-pressure polymerization process, such as the Ziegler process, against deterioration caused by light, heat and oxygen. However, it is stated that these stabilizer compositions are incapable of protecting the polymer effectively against deterioration in properties caused by contact between copper and polymer. In discussing the prior art, it is indicated that British Patent No. 890,761 discloses stabilizer combinations offering protection against deterioration caused by contact between copper and polymer, viz. a combination comprising a diester of a beta-thiodipropionic acid and a bisphenol obtained by the condensation reaction of 1 mol of saturated aldehyde or ketone having 4 to 6 carbon atoms or of sulphur dichloride and 2 mols of a phenol having a non-reactive ortho substituent and a non-substituted para ring carbon atom. British Patent No. 951,931 also discloses the incorporation of a diester of beta-thiodipropionic acid in combination with a certain trisphenolic compound which is obtained by the condensation reaction of either 1 mol of unsaturated aldehyde or ketone and 3 mols of phenol having a non-reactive ortho or para hydrocarbon substituent, or 1 mol of hydroxyaryl-substituted saturated aldehyde or ketone and 2 mols of phenol having a non-reactive ortho or para hydrocarbon substituent, into polymers in order to stabilize the latter against deterioration caused by contact with copper.

However, British Patent No. 994,116 states at page 2, column 1, that "the stability of such polymer compositions containing the relevant stabilizer combinations comprising these diesters plus said bis- or trisphenolic compounds leaves much to be desired when these compositions—whether or not in contact with copper—are exposed to elevated temperatures. This gives rise to serious difficulties during the manufacture of the insulated electric conductors from which the insulating material consists of such stabilized compositions, since these are manufactured by coating the conductor with heat-plastified or molten polymer material. As is known, high temperatures, generally higher than 150° C., are used when such coatings are applied. Moreover, electric conductors coated with such stabilized compositions are, of course, not very suitable for use at elevated temperatures."

British Patent No. 994,116 suggests that this problem can be met by incorporating in the polymer together with the organic sulfur compound and a polynuclear polyphenol, a bis- or trisphenolic compound obtained by the reaction of either a saturated or unsaturated aldehyde or ketone, of sulfur dichloride, and a phenol having at least one ortho-ring carbon atom bound to a secondary or tertiary alkyl group. Apparently, the bis- or trisphenolic compound when employed with the above stabilizers protects the polymer against deterioration caused by contact between copper and polymer even when the polymer is exposed to elevated temperatures, such as 150° C. and above.

British Patent No. 951,936 to Imperial Chemical Industries, Limited, discusses the problem of protection of polyolefins containing phenolic antioxidants against copper-catalyzed oxidative deterioration. The phenolic compounds are said to be especially effective as antioxidants when they are used in conjunction with an organic sulfur compound having a molecular weight of at least 250. This patent provides a polymeric composition suitable for use in close contact with copper, which composition comprises a solid polymer of propylene, particularly isotactic polypropylene, a phenolic antioxidant, and non-volatile primary or secondary aromatic or aliphatic amino compounds, the secondary aromatic amino compounds having at least one nitrogen atom to which is attached not more than one aryl group. These amines are, in general, not those which are generally preferred as antioxidants in rubber and plastics. Many of these amino compounds, e.g., p-aminoacetanilide, do not confer any extra protection on polypropylene stabilized with mixtures of phenolic compounds and sulphur compounds in the absence of copper, and do not prevent the degradation of polypropylene in the presence of copper when they are used in the absence of the phenolic stabilizer. The aliphatic amino compounds usually cause less staining than the aromatic amino compounds, the acid hydrazides being particularly good in this respect.

U.S. Patent No. 3,367,907 to Hansen teaches polyolefin compositions stabilized against degradation accelerated by the presence of copper. There is incorporated in the polymer an antioxidant, such as a phenol, and a "copper inhibitor," which can be any azimidobenzene containing the radical.

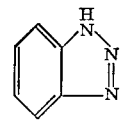

or any corresponding benzotriazine characterized by the structure:

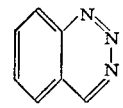

In accordance with the instant invention, heterocyclic hydrazines and lactams are provided which are useful in olefin polymer compositions, such as polypropylene, containing one or more olefin polymer stabilizers, and which can come in contact with copper.

In the presence of such compounds, the usual catalytic effect of copper on the rate of degradation of the olefin polymer is not observed, and instead, the olefin polymer displays a resistance to degradation, enhanced by the usual olefin polymer stabilizer or stabilizer system, that is virtually as high as though the copper were not present. This is especially surprising in view of the fact that copper substantially reduces the effectiveness of most commercially available antioxidants in olefin polymers even when so called conventional "copper deactivators" are incorporated in the polymer.

Further in accordance with the instant invention, stabilizer systems for olefin polymers are provided consisting essentially of at least one olefin polymer stabilizer and a heterocyclic hydrazine or lactam to substantially reduce and in many cases overcome any depreciative effect of copper on the olefin polymer stabilizer or olefin polymer.

In addition, in accordance with the invention, olefin polymer compositions are provided, such as propylene polymer compositions, consisting essentially of olefin polymer and at least one heterocyclic hydrazine or lactam.

Olefin polymer compositions of the invention containing a heterocyclic hydrazine or lactam can be used in contact with copper and can be combined with the usual olefin polymer stabilizers to enhance resistance to oxidative deterioration. Consequently, such olefin polymer compositions include, optionally, at least one olefin polymer stabilizer.

Further in accordance with the instant invention, a process for enhancing the resistance of olefin polymers, such as propylene polymers, to copper-catalyzed oxidative deterioration is provided, which comprises incorporating in the olefin polymer at least one heterocyclic hydrazine or lactam as defined herein, and optionally, at least one olefin polymer stabilizer.

The olefin polymer stabilizers which can be employed in the invention include, for instance, phenols, organic phosphites, thiodipropionic acid esters, polyvalent metal salts of organic acids, and hydrocarbon sulfides and polysulfides, and conventional olefin polymer light stabilizers as will be seen hereinafter.

The heterocyclic hydrazines or lactams in accordance with the invention have the following structure:

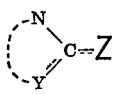

wherein

represents a heterocyclic ring structure which includes at least one five or six membered ring, the ring atoms being carbon, nitrogen, and Y; Y is selected from the group consisting of nitrogen, carbon or sulfur; and Z is selected from the group consisting of (1)
$$-\overset{X}{\underset{\|}{C}}-NHNHR_1$$

$R_1$ is selected from the group consisting of hydrogen, alkyl having from one to about eighteen carbon atoms, aryl and $$-\overset{X}{\underset{\|}{C}}-R_2$$

wherein $R_2$ is selected from the group consisting of —$R_3$ and $HSR_4$—

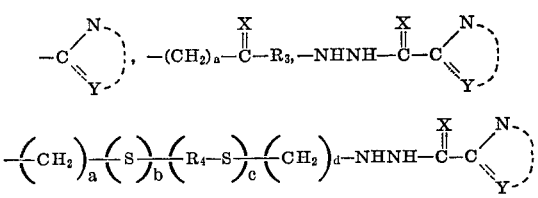

and

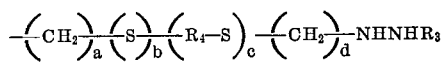

wherein $R_3$ is alkyl having from one to about eighteen carbon atoms, aryl, benzyl and hydroxyaryl, $a$, $b$ and $d$ are 0, 1 or 2, $R_4$ is alkylene having from one to six carbon atoms or arylene, and $c$ is 0 or 1;

(2)
$$-\overset{X}{\underset{\|}{C}}-NHR_5$$

$R_5$ is

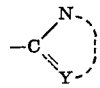

or —$N$=$CHR_6$, wherein $R_6$ is selected from the group consisting of $R_3$,

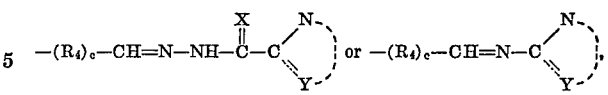

(3)
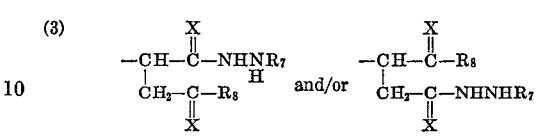

wherein $R_8$ is selected from the group consisting of aryloxy, alkoxy or —NHNHR$_7$ and

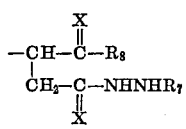

or

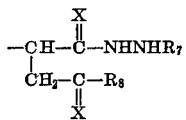

can form a ring

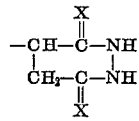

or

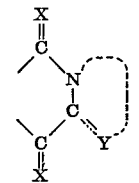

$R_7$ is selected from the group consisting of hydrogen and $R_3$ and

X in each of the above formulae is selected from the group consisting of oxygen and sulfur.

Typical

heterocyclic ring structures include pyrrole, pyridine, pyrrolizine, pyrrolidone, pyrrolone, pyrazine, quinoline, triazole, imidazole, tetrazole, imidazoline, imidazolidine, imidazolone, benzoimidazole, benzoimidazolone, pyrazole, pyrazolone, indazole, thiazole, pyridazine, pyrimidine, quinolizine, pyrazine, piperazine, triazine, tetrazine, indole, indoline, benzothiazole, benzopyrazole, indolenine, and isothiazole; the preferred heterocyclic ring structures are 2-pyrrolidone 5-carboxylic acid derivatives.

Typical $R_1$ and $R_3$ alkyl groups include methyl, ethyl, propyl, isopropyl, n-butyl, sec-butyl, tert-butyl, pentyl, hexyl, heptyl, n-octyl, iso-octyl, nonyl, decyl, undecyl, and dodecyl; typical $R_1$, $R_3$ aryl groups include phenyl and naphthyl; typical $R_3$ hydroxyaryl groups include hydroxyphenyl and hydroxynaphthyl; typical $R_8$ alkoxy groups include methoxy, ethoxy, propoxy, hexyloxy, and lauryloxy; and typical $R_8$ aryloxy groups include phenoxy and methylphenoxy.

Examples of compounds falling within the present invention include:

1. 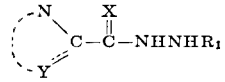

2. 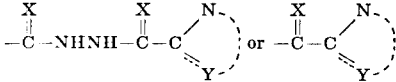

3. 

4. 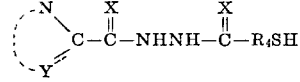

5. 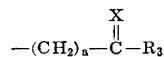

6. 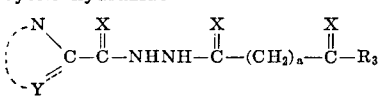

7. 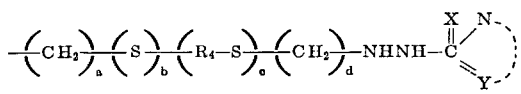

8. 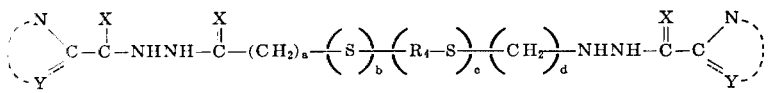

9. 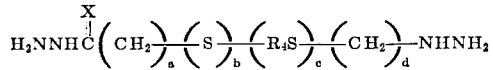

10. 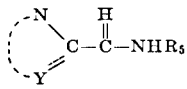

11. 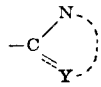

12. [structure]

These compounds are prepared by known procedures which form no part of the invention. Thus, for example, nitrogen containing heterocyclic hydrazines of the sub-genus $$\underset{\phantom{X}Y}{\overset{-N}{\diagdown}}C-\overset{X}{\underset{\|}{C}}-NHNHR_1$$

wherein $R_1$ is hydrogen, alkyl or aryl or $$-\overset{X}{\underset{\|}{C}}-NHNH-\overset{X}{\underset{\|}{C}}-C\diagup\overset{N}{\diagdown}\underset{Y}{} \quad \text{or} \quad -\overset{X}{\underset{\|}{C}}-C\diagup\overset{N}{\diagdown}\underset{Y}{}$$

can be prepared by reaction of a heterocyclic containing carboxylic acid or thiono acid or ester thereof and a hydrazine.

Where $R_1$ is $$-\overset{X}{\underset{\|}{C}}-R_2$$

and $R_2$ is $HSR_4-$, the heterocyclic hydrazine $$\underset{\phantom{X}Y}{\overset{-N}{\diagdown}}C-\overset{X}{\underset{\|}{C}}-NHNH-\overset{X}{\underset{\|}{C}}-R_4SH$$

can be prepared by reaction of a heterocyclic carboxylic acid or thiono acid hydrazide with a mercapto carboxylic acid or ester or thio acid.

Where $R_2$ is $$-(CH_2)_a-\overset{X}{\underset{\|}{C}}-R_3$$

the heterocyclic hydrazide $$\underset{\phantom{X}Y}{\overset{-N}{\diagdown}}C-\overset{X}{\underset{\|}{C}}-NHNH-\overset{X}{\underset{\|}{C}}-(CH_2)_a-\overset{X}{\underset{\|}{C}}-R_3$$

can be prepared by the reaction of the heterocyclic carboxylic or thiono acid hydrazide with a partial ester of a dicarboxylic acid or thiono acid.

Where $R_2$ is $$-\!\!\left(CH_2\right)_a\!\!\left(S\right)_b\!\!\left(R_4-S\right)_c\!\!\left(CH_2\right)_d\!\!-NHNH-\overset{X}{\underset{\|}{C}}\diagup\overset{N}{\diagdown}\underset{Y}{}$$

the heterocyclic hydrazine $$\underset{\phantom{X}Y}{\overset{-N}{\diagdown}}C-\overset{X}{\underset{\|}{C}}-NHNH-\overset{X}{\underset{\|}{C}}-(CH_2)_a\!\!-\!\!\left(S\right)_b\!\!\left(R_4-S\right)_c\!\!\left(CH_2\right)_d\!\!-NHNH-\overset{X}{\underset{\|}{C}}-C\diagup\overset{N}{\diagdown}\underset{Y}{}$$

can be prepared by reaction of two moles of heterocyclic carboxylic acid and one mole of $$H_2NNH\overset{X}{\underset{\|}{C}}\!\!\left(CH_2\right)_a\!\!\left(S\right)_b\!\!\left(R_4S\right)_c\!\!\left(CH_2\right)_d\!\!-NHNH_2$$

Heterocyclic hydrazines of the sub-genus $$\underset{\phantom{X}Y}{\overset{-N}{\diagdown}}C-\overset{H}{\underset{\|}{C}}-NHR_5$$

wherein $R_5$ is $$-C\diagup\overset{N}{\diagdown}\underset{Y}{}$$

can be prepared by reaction of a heterocyclic carboxylic acid or thiono acid or ester thereof with a heterocyclic amine.

Where $R_5$ is —N=CHR$_6$ and $R_6$ is

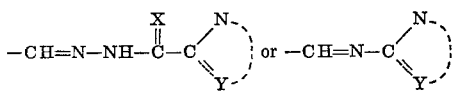

the heterocyclic hydrazine can be prepared by condensation of heterocyclic acid or thiono acid amide or hydrazide or mixtures of the two with aldehydes.

Heterocyclic hydrazines of the formula

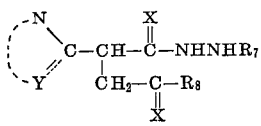

where $R_8$ is aryloxy or alkoxy can be prepared by reaction of, for example, pyrrole with maleic acid derivatives of the formula

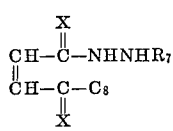

where $R_7$ and $R_8$ are as previously defined.

In the case where $R_7$ is hydrogen and $R_8$ is —NHNH$_2$, the heterocyclic hydrazine

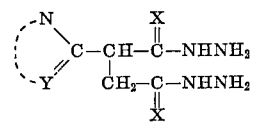

can be prepared by reaction of a heterocyclic ketone with maleic dihydrazine.

Nitrogen containing heterocyclic lactams of the subgenus

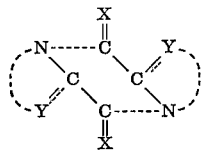

can be prepared by the self amidation of heterocyclic carboxylic acid or thiono acid.

The stabilizer system of the invention comprises one or more compounds of the invention in combination with at least one olefin polymer stabilizer, and preferably, two or more such stabilizers. It is well known that in the case of olefin polymers, combinations of stabilizers can be complementary, and can enhance the resistance of the olefin polymer to oxidative deterioration. Such enhanced stabilizing effectiveness when present in the olefin polymer stabilizer combination continues to be evidenced in the presence of the compound or compounds of the invention.

Stabilizer systems of the invention comprising a compound of the invention and an olefin polymer stabilizer can be formulated and marketed as such, ready for use by the converter of the olefin polymer into useful products.

A variety of olefin polymer stabilizers can be used, of which the following are exemplary.

The organic phosphite can be any organic phosphite having one or more organic radicals attached to phosphorus through oxygen. These radicals can be monovalent radicals in the case of the triphosphites, diphosphites and monophosphites, which can be defined by the formula:

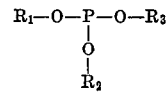

in which $R_1$, $R_2$ and $R_3$ are selected from the group consisting of hydrogen, alkyl, alkenyl, aryl, alkaryl, aralkyl, and cycloalkyl groups having from one to about thirty carbon atoms.

Also included are the organic phosphites having a bivalent organic radical forming a heterocyclic ring with the phosphorus of the type:

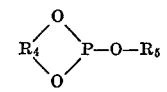

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

Also useful in the compositions of the invention are mixed heterocyclic-open chain phosphites of the type:

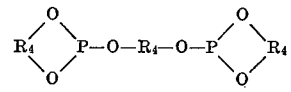

More complex phosphites are formed from trivalent organic radicals, of the type:

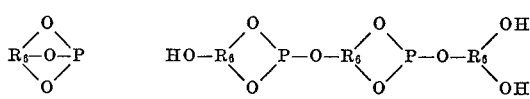

in which $R_6$ is a trivalent organic radical of any of the types of $R_1$ to $R_5$, inclusive, as defined above.

An especially preferred class of organic phosphites have a bicyclic aromatic group attached to phosphorus through oxygen, with no or one or more phenolic hydroxyl groups on either or both of the aromatic rings. These phosphites are characterized by the formula:

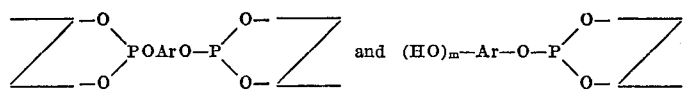

in which Ar is a mono or bicyclic aromatic nucleus and $m$ is an integer of from 0 to about 5. Z is one or a plurality of organic radicals as defined above for $R_1$ to $R_6$, taken singly or together in sufficient number to satisfy the valences of the two phosphite oxygen atoms. Z can also be hydrogen, and can include additional bicyclic aromatic groups of the type (HO)$_m$—Ar.

The term "organic phosphite" as used herein is inclusive of the above-described mono-, di- and triphosphites. Usually, the phosphite will not have more than about sixty carbon atoms.

Exemplary are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonphenyl) phosphite, benzyl methyl isopropyl phosphite, butyl dicresyl phosphite, isooctyl di(octylphenyl) phosphite, di(2-ethylhexyl)(isooctylphenyl) phosphite, tri(2-cyclohexylphenyl) phosphite, tri-α-naphthyl phosphite, tri(phenyl-phenyl) phosphite, tri(2-phenyl ethyl) phosphite, mono-dodecyl phosphite, di(p-tert-butyl phenyl) phosphite, decyl phenyl phosphite, tert-butyl-phenyl 2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxaphosphorinane, 2-octoxy-5,5-dimethyl-dioxaphosphorinane, 2-cyclohexyloxy-5,5-diethyl dioxaphosphorinane, monophenyl phosphite, 2-ethylhexyl phosphite, isooctyl phosphite, cresyl phosphite, t-octylphenyl phosphite, t-butyl phosphite, diphenyl phosphite, diisooctyl phosphite, dicresyl phosphite, dioctylphenyl phosphite, didodecyl phosphite, di-α-naphthyl phosphite, ethylene phosphite, butyl cresyl phosphite, phenyl-mono-2-ethylhexyl phosphite, isooctyl monotolyl phosphite phenyl cyclohexyl phosphite.

Exemplary of the bis aryl phosphites are:

bis(4,4'-thio-bis(2-tertiary butyl-5-methyl-phenol)) isooctyl phosphite,
mono(4,4'-thio-bis(2-tertiary-butyl-5-methyl-phenol)) di-phenyl phosphite,
tri-(4,4'-n-butylidene-bis(2-tertiary-butyl-5-methyl-phenol)) phosphite,
(4,4'-benzylidene-bis(2-tertiary-butyl-5-methyl-phenol)) diphenyl phosphite,
isooctyl 2,2'-bis(-parahydroxyphenyl) propane phosphite,
tri-decyl 4,4'-n-butylidene-bis(-2-tertiary butyl-5-methyl-phenol) phosphite,
4,4'-thiobis(2-tertiary butyl-5-methylphenol) phosphite,
2-ethylhexyl-2,2'-methylene-bis(4-methyl-6-1'-methylcyclohexyl) phenol phosphite,
tri(-2,2'-bis-(parahydroxy phenyl) propane) phosphite,
tri (-4,4'-thio-bis(2-tertiary-butyl-5-methyl-phenol)) phosphite,
isooctyl-(2,6-bis(2'-hydroxy-3,5-dinonylbenzyl)-4-nonyl phenyl) phosphite,
tetra-n-dodecyl-4,4'-n-butylidenebis (2-tertiary-butyl-5-methyl phenyl) diphosphite,
tetra-isooctyl 4,4'-thiobis(2-tertiary butyl-5-methyl phenyl) diphosphite,
2,2'-methylene-bis(4-mthyl 6,1'-methyl cyclo-hexyl phenyl) phosphite,
isooctyl-4,4'-isopropylidene-bis-phenyl-polyphosphite,
2-ethylhexyl-2,2'-methylene-bis(4-methyl-6,1'-methylcyclohexyl) phenyl triphosphite,
tetra-tridecyl-4,4'-oxydiphenyl disphosphite,
tetra-tridecyl 4,4'n-butylidene-bis(2-tertiary butyl-5-methylphenyl) diphosphite,
tetra-tridecyl-4,4'-isopropylidene bisphenyl diphosphite,
tri-tridecyl butane-1,1, and
3-tris(2'-methyl-5'-tertiary-butylphenyl-4'-) triphosphite.

The phenol stabilizers contain one or more phenolic hydroxyl groups, and one or more phenolic nuclei and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

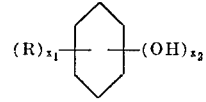

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

Polycyclic phenols include aromatic nuclei which are linked by a bivalent linking radical, and are defined by the formula:

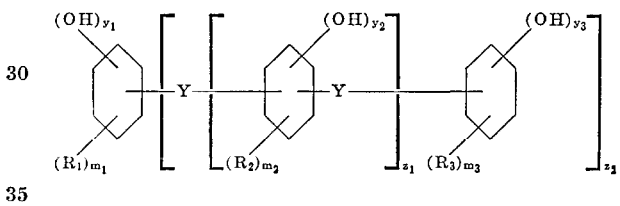

wherein $R_1$, $R_2$ and $R_3$ are inert substituent groups of the type of R above, Y is a bivalent linking radical; $m_1$ is an integer from zero to a maximum of $5-(z_2+y_1)$, $m_2$ can be an integer from zero to three and $m_3$ an integer from zero to four, $z_1$ can be an integer from zero to about six and $z_2$ an integer from one to five, preferably one. Preferably, the hydroxyl groups in polycyclic phenols are located ortho and/or para to Y. There can be one or more hydroxyl groups per phenyl nucleus, $y_1$, $y_2$ and $y_3$ representing the number thereof. Preferably, there will be only one hydroxyl group per phenyl nucleus. The phenolic hydroxyl may be either hindered, i.e., substituted in both positions ortho to the hydroxyl group, or partially hindered or unhindered, i.e., substituted in one or neither position.

Y can be a single bond, as in diphenyl, or a bivalent group, such as:

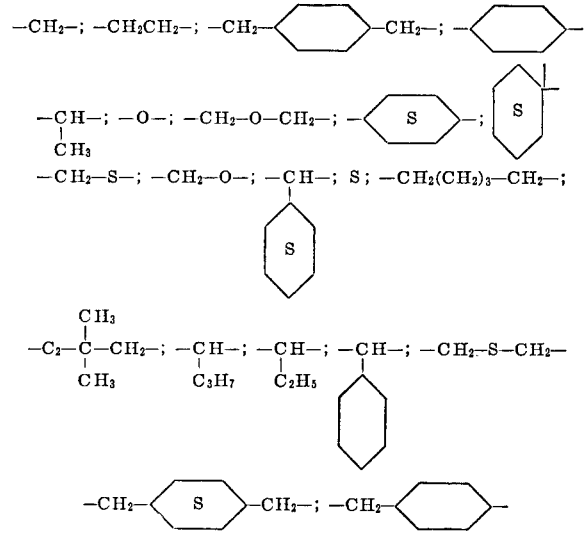

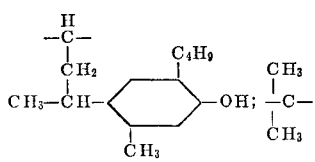

Representative phenols include guaiacol, resorcinol monoacetate, vanillin, butyl salicylate, 2,6-ditert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl phenol, and o-, m- and p-octyl phenol, o- and m-tert-butyl-p-hydroxyanisole, p-n-decyloxy phenol, p-n-decyloxy cresol, nonyl n-decyloxy cresol, eugenol, isoeugenol, glyceryl monosalicylate, methyl-p-hydroxy-cinnamate, 4-benzyloxyphenol, p-acetylaminophenol, p-stearyl-aminophenol methyl-p-hydroxybenzoate, p-di-chlorobenzoyl, aminophenol and p-hydroxysalicyl anilide.

Exemplary polyhydric phenols are orcinol, propyl gallate, catechol, resorcinol, 4-octyl resorcinol, 4-dodecyl resorcinol, 4-octadecyl catechol, 4-isooctyl-phloroglucinol, pyrogallol, hexahydroxy benzene, 4-isohexylcatechol, 2,6-ditertiary-butyl resorcinol, 2,6-diisopropyl phloroglucinol.

Exemplary polyhydric bisphenols are methylenebis-(2,6-ditertiarybutyl-phenol),
2,2-bis-(4-hydroxy phenyl)-propane,
methylene-bis(p-cresol),
4,4'-oxobis-(3-methyl-6-isopropyl phenol),
2,2'-oxobis-(4-dodecyl phenol),
4,4'-n-butylidenebis-(2-tertiary butyl-5-methylphenol),
4,4'-benzylidenebis-(2-tertiary butyl-5-methylphenol),
4,4'-cyclohexylidenebis-(2-tertiary butylphenol),
4,4'-thiobisphenol,
4,4'-thiobis(3-methyl-6-tertiary-butylphenol),
2,2'-thiobis(4-methyl-6-tertiary-butylphenol),
2,2'-methylenebis(4-methyl-6-(1'-methyl-cyclohexyl)-phenol),
2,6-bis(2'-hydroxy-3'-tertiary-butyl-5'-methylbenzyl)-4-methylphenol,
1,1,3-tris-(2'-methyl-4'-hydroxy-5'-tertiary butylphenyl) butane.

The thiodipropionic acid ester has the following formula:

$$R_1OOCCH_2CH_2-S-CH_2CH_2COOY$$

in which $R_1$ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

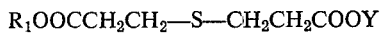

$R_1O[OCCH_2CH_2SCH_2CH_2COOXO]_n$
$OCCH_2CH_2-S-CH_2CH_2COOZ$ where Z is hydrogen, $R_2$ or M; n is the number of thiodipropionic acid ester units in the chain; and X is a bivalent hydrocarbon group of the type of $R_1$; the value of n can range upwards from 1, but there is no upper limit on n except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about ten to about sixty carbon atoms per sulfur atom.

Accordingly, the various thiodipropionic acid ester species coming within the above-mentioned categories within the general formula can be defined as follows:

(a)  $R_1OOCCH_2CH_2SCH_2CH_2COOH$
(b)  $R_1OOCCH_2CH_2SCH_2CH_2COOR_2$
(c)  $R_1[OCCH_2CH_2SCH_2CH_2COOX-O]_n$
     $OCCH_2CH_2SCH_2CH_2COOZ$
(d)  $[R_1OOCCH_2CH_2SCH_2CH_2COO]_2M$

In the above formulae $R_1$ and $R_2$, M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene,

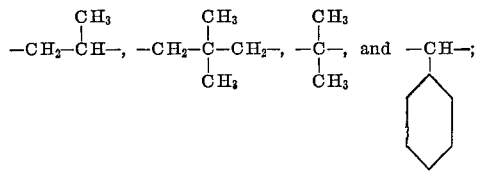

arylene radicals such as phenylene

methylenephenylene

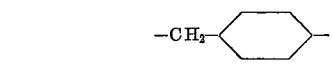

dimethylene phenylene,

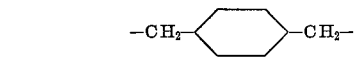

and alicyclene radicals such as cyclohexylene

and cyclopentylene

As exemplary of the thiodipropionic acid esters which can be used, there can be mentioned the following: monolauryl thiodipropionic acid, dilauryl thiodipropionate, butyl stearyl thiodipropionate, di(2-ethylhexyl)-thiodipropionate, diisodecyl-thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono-(dodecylbenzyl) thiodipropionic acid.

These esters are for the most part known compounds, but where they are not available, they are readily prepared by esterification of thiodipropionic acid and the corresponding alcohol.

When the compounds of the invention are used in conjunction with a polyvalent metal salt of an organic acid, the polyvalent metal salt of an organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogeneous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

The hydrocarbon sulfides and polysulfides can contain one sulfur atom or two or more sulfur atoms linked in a polysulfide unit. Usually, the sulfides and polysulfides will not have more than fifty carbon atoms. They can be defined by the formula:

$$R(S)_n\text{---}R$$

wherein $n$ is the number of sulfur atoms and ranges from one to about six, and R is an organic radical having from one to about thirty carbon atoms, such as alkyl, aryl, alkaryl, aralkyl, and cycloalkyl. The following compounds are typical: dibutyl sulfide, didecyl sulfide, diphenyl sulfide, dibenzyl sulfide, butyl octyl sulfide, di-n-dodecyl trisulfide, di-tertiary dodecyl disulfide, di-para-tertiary butyl phenyl trisulfide, dibenzyl disulfide, dibenzyl tetra sulfide, and dibenzyl trisulfide.

Light stabilizers for olefin polymers can also be added, for example, 2-hydroxy benzophenones, o-hydroxyphenyl-benzotriazoles, 1-dioxides of $\alpha,\beta$-benzoisothiazolone and 1,3,5-triazines and nickel organophosphites as disclosed in application Ser. No. 487,614, now U.S. Patent No. 3,395,112, patented July 30, 1968.

In another embodiment of the invention, as previously indicated, one or more compounds of the invention can be combined with the olefin polymer. Such compositions are readily marketed by the polymer manufacturer as an olefin polymer which can be used in contact with copper, and can be combined with the usual olefin polymer stabilizers by the converter in the usual way, without any modification whatsoever, so as to obtain the benefits of the invention due to the presence in the formulation of a compound of the invention. Such compositions have the special advantage that they can be processed using the usual techniques, and, in addition, the usual olefin polymer stabilizer systems will behave virtually in their normal way, even when the composition is in contact with copper.

The preferred stabilizer system of the invention comprises the compounds of the invention and two olefin polymer stabilizers, a phenol, and a thiodipropionic acid ester. An additional fourth ingredient which is included in the preferred systems of the invention but which is not essential is an organic phosphite, and a fifth optional ingredient is a polyvalent metal salt of an organic acid. The olefin polymer stabilizers together give an enhanced stabilization which is not obtainable from any of them alone or in combinations of two with the compound of the invention.

A further improvement in resistance to degradation is obtained if to the stabilizer composition of the invention there be added a polyol such as pentaerythritol and/or dipentaerythritol, or trimethylol propane oxyacids, such as malic acid, tartaric acid or citric acid, epoxy compounds such as epoxy soybean oil and butylepoxy stearate; or borate esters such as phenyl lauryl borate, tristearyl borate and 2,6-di-t-butyl-4-methyl-phenyl borate. Only a small amount is sufficient to give a noticeable improvement. From 0.5 to 10% is satisfactory.

The compounds of the invention are not olefin polymer stabilizers. However, where the compounds of the invention are employed in conjunction with an olefin polymer stabilizer, such as a phenol, and a thiodipropionic acid ester, and the olefin polymer is in contact with copper, the polymer's resistance to embrittlement and reduction in melt viscosity at elevated temperatures can be almost as high as though the copper were not present. An organic phosphite and/or a polyvalent metal salt, employed in conjunction with the phenol and thiodipropionic acid ester and compounds of the invention, can further enhance resistance of the polymer to discoloration in the presence of copper. In many cases, an enhanced synergistic stabilizer activity is observed in such combinations.

The compound of the invention can minimize any catalytic effect of copper on the rate of degradation of the olefin polymer in the presence of olefin polymer stabilizers. Very small amounts can significantly reduce this effect. Amounts within the range from about 0.05 to about 5% by weight of the polypropylene are satisfactory. Preferably, from 0.1 to 1.0% is employed.

The amount of total stabilizer including the olefin polymer stabilizer and the compound of the invention is within the range from about 0.05 to about 5%, preferably from 0.1 to 2.5%. Of this, the olefin polymer stabilizer comprises from about 0.001 to about 4% by weight, and the compound of the invention from about 0.05 to about 4% by weight. The preferred olefin polymer stabilizer comprises from about 0.025 to about 0.5% of a phenol, from about 0.05 to about 1% of a thiodipropionic acid ester, and optionally, from about 0.05 to about 1.25% of a phosphite, and from about 0.025 to about 0.75% of a polyvalent metal salt, when present.

The compounds of the invention and the olefin polymer stabilizers may be formulated as a simple mixture for incorporation in the polymer by the polymer manufacturer or by the converter. An inert organic solvent can be used to facilitate handling, if the ingredients do not form a homogeneous mixture or solution.

Polypropylene solid polymer can be defined in a manner to differentiate it from other polyolefins as having a density within the range of from 0.86 to 0.91, and a melting point above 150° C. The stabilizer of the invention is applicable to all such polypropylenes, as distinguished from polypropylenes in the liquid form or in semiliquid or gel-like forms, such as are used as greases and waxes.

The stabilizer system of the invention is applicable to polypropylenes prepared by any of the various procedures, for the molecular weight and tacticity are not factors affecting this stabilizer. Isotactic polypropylene, available commercially under the trade names Profax, Escon and Olefane and having a softening or hot-working temperature of about 350° F., is an example of a sterically regular polypropylene polymer.

Mixtures of polypropylene with other compatible polymers and copolymers of propylene with copolymerizable monomers also can be stabilized in accordance with this invention. For example, mixtures of polyethylene and polypropylene, and copolymers of propylene and ethylene which contain a sufficient amount of propylene to present the instability problem that is resolved by the olefin polymer stabilizers of the invention, may be stabilized by the addition of one or a combination of several polypropylene stabilizers.

The stabilizer systems of the invention may also be used with polyolefins higher than polypropylene, such as polybutylene and polyisobutylene.

The stabilizer system is incorporated in the polymer in suitable mixing equipment, such as a mill or a Banbury mixer. If the polypropylene has a melt viscosity which is too high for the desired use, the polypropylene can be worked until its melt viscosity has been reduced to the desired range before addition of the stabilizer. However, polypropylenes in a range of workable melt viscosities are now available. Mixing is continued until the mixture is substantially uniform. The resulting composition is then removed from the mixing equipment and brought to the size and shape desired for marketing or use.

The stabilized polypropylene can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on ageing and heating.

The following examples in the opinion of the inventors represent preferred embodiments of the stabilizer compositions and olefin polymer compositions of their invention.

EXAMPLES 1 TO 34

Polypropylene compositions were prepared, stabilized by combinations of compounds of the invention and known polypropylene stabilizers, and were evaluated for their resistance to oxidative degradation in the presence of copper. An accelerated oxidation test was employed, to determine the effective useful life of the polypropylene. The time required for a polypropylene sample to absorb 10 cc. of oxygen per gram of sample, when heated at 150° C. in a closed system, was determined. This time is the induction time.

The base olefin polymer composition tested was as follows:

|  | Parts by weight |
|---|---|
| Polypropylene (Profax 6501) | 100 |
| 1,1,3 - tris(2' - methyl - 4'-hydroxy-5'-tert-butylphenyl)butane | 0.05 |
| Distearyl thiodipropionate | 0.15 |
| Trinonylphenyl phospite | 0.1 |
| Copper powder | 1.0 |

The components listed were mixed on a two roll mill and sheeted off to form 0.5 mm. sheets. To each sample, there was also added 0.5 part of the compound listed in Table I.

As Control A, the base composition was tested, without copper. As Control B, the base composition was tested with copper. As Control C, the base composition containing added oxanilide also was tested.

Table I below sets out the results of the test for each compound tested.

TABLE I

| Example number | Compound | Induction time (hours) |
|---|---|---|
| Control: | | |
| A (no copper) | None | 1,200 |
| B (with copper) | do | <20 |
| C | Oxanilide | 300 |
| 1 | 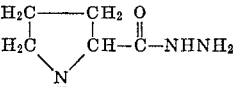 | 1,800 |
| 2 | 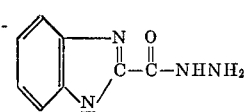 | 1,500 |
| 3 | 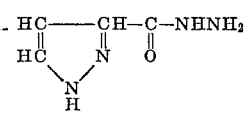 | 1,900 |

TABLE I—Continued

| Example number | Compound | Induction time (hours) |
| --- | --- | --- |
| 4 | (structure) | 1,850 |
| 5 | (structure) | 2,000 |
| 6 | (structure) | 2,100 |
| 7 | (structure) | 2,050 |
| 8 | (structure) | 1,850 |
| 9 | (structure) | 1,800 |
| 10 | (structure) | 1,550 |
| 11 | (structure) | 1,700 |
| 12 | (structure) | 1,600 |
| 13 | (structure) | 1,750 |
| 14 | (structure) | 2,300 |
| 15 | (structure) | 2,150 |
| 16 | (structure) | 2,350 |
| 17 | (structure) | 1,800 |
| 18 | (structure) | 2,000 |

TABLE I—Continued

| Example number | Compound | Induction time (hours) |
|---|---|---|
| 19 | (succinimide)-CH-C(=O)-NHNH-C(=O)-C₂H₄-S-C₂H₄-C(=O)-NH-NH-C(=O)-CH-(succinimide) | 2,100 |
| 20 | (succinimide)-CH-C(=O)-NHNH-C(=O)-CH₂-C(=O)-CH₃ | 1,550 |
| 21 | (succinimide)-CH-C(=S)-NHNH₂ | 1,950 |
| 22 | (succinimide)-CH-C(=O)-NHN=CH-(2-hydroxyphenyl) | 1,900 |
| 23 | (thiazole)-C-C(=O)-NHN=CH-(phenyl) | 1,450 |
| 24 | (succinimide)-CH-C(=O)-NHN=CH-CH=NHN-C(=O)-CH-(succinimide) | 1,500 |
| 25 | (thiazole)-C-C(=O)-NH-C-(triazole) | 2,200 |
| 26 | (succinimide)-CH-C(=O)-NH-C-(triazole) | 2,250 |
| 27 | (imidazole)-C-C(=O)-NH-C-(triazole) | 2,100 |
| 28 | (N-CH₂OH-imidazole)-C-C(=O)-NH-C-(N-CH₂OH-triazole) | 1,650 |
| 29 | (pyrrolidinone)-CH-C(=O)-NH-C-(triazole) | 1,900 |
| 30 | (imidazole)-C-CH-C(=O)-NH / CH₂CO-NH | 1,700 |
| 31 | (imidazole)-C-CH-C(=O)-NHNH₂ / CH₂-C(=O)-OC₁₈H₃₇ | 1,350 |

TABLE I—Continued

| Example number | Compound | Induction time (hours) |
|---|---|---|
| | and/or<br>$\begin{array}{c}HC{=\!=\!=}CH\quad O\\ \|\quad\quad\|\quad\quad\|\\ HC\quad\; C-CH-C-OC_{18}H_{37}\\ \diagdown N\diagup\quad\;\; CH_2-C-NHNH_2\\ \;\;\;H\quad\quad\quad\quad\quad\|\\ \quad\quad\quad\quad\quad\quad\quad\; O\end{array}$ | |
| 32 | $\begin{array}{c}HC{=\!=\!=}CH\quad O\\ \|\quad\quad\|\quad\;\|\\ HC\quad\; C-\!-\!-C\\ \diagdown N\diagup\quad\quad\diagdown N\\ \;\;\;\|\quad\quad\quad\quad\quad\|\\ \;\;\,C-\!-\!-C\quad\quad CH\\ \;\;\,\|\quad\quad\quad\;\|\\ O\;\;\,HC{=\!=\!=}CH\end{array}$ | 1,750 |
| 33 | benzimidazole dimer structure | 1,800 |
| 34 | $\left(\begin{array}{c}H_2C{-\!-\!-}CH_2\;O\quad\quad\;O\\ \|\quad\quad\quad\|\quad\;\|\quad\quad\quad\|\\ O{=}C\quad\quad CH-C-NHNH-C-CH_2S\\ \diagdown N\diagup\\ \;\;\;H\end{array}\right)_{\!2}\!\!\!-CH_2$ | 1,700 |

The improvement in resistance of the polypropylene to oxidative degradation is evident.

EXAMPLES 35 TO 52

The procedure described in Examples 1 to 34 was repeated with the exception that 0.2 part of a polyol, namely pentaerythritol, dipentaerythritol or trimethylol propane, was incorporated in the polypropylene samples.

Table II below sets out the data obtained for each compound of the invention.

TABLE II

| Example number | Compound | Polyols, parts | | | Induction time (hrs.) |
| | | Pentaerythritol | Dipentaerythritol | Trimethylol propane | |
|---|---|---|---|---|---|
| Control: | | | | | |
| A (no copper) | None | | | | 1,200 |
| B | do | | | | <20 |
| C | Oxanilide | | | | 300 |
| D | None | 0.2 | | | <20 |
| E | do | | 0.2 | | <20 |
| F | do | | | 0.2 | <20 |
| 35 | $\begin{array}{c}H_2C{-\!-\!-}CH_2\;O\\ \|\quad\quad\quad\|\quad\;\|\\ H_2C\quad\quad CH-C-NHNH_2\\ \diagdown N\diagup\\ \;\;\;H\end{array}$ | 0.2 | | | 2,150 |
| 36 | Same as above | | 0.2 | | 2,000 |
| 37 | do | | | 0.2 | 2,050 |
| 38 | $\begin{array}{c}H_2C{-\!-\!-}CH_2\;O\\ \|\quad\quad\quad\|\quad\;\|\\ O{=}C\quad\quad CH-C-NHNH_2\\ \diagdown N\diagup\\ \;\;\;H\end{array}$ | 0.2 | | | 2,400 |
| 39 | Same as above | | 0.2 | | 2,350 |
| 40 | $\begin{array}{c}H_2C{-\!-\!-}CH_2\;O\quad\quad\;O\\ \|\quad\quad\quad\|\quad\;\|\quad\quad\quad\;\|\\ O{=}C\quad\quad CH-C-NHNH-C-CH_2-SH\\ \diagdown N\diagup\\ \;\;\;H\end{array}$ | 0.2 | | | 2,050 |
| 41 | $\begin{array}{c}H_2C{-\!-\!-}CH_2\;O\quad\quad\;O\quad\quad\quad\;O\quad\;H_2C{-\!-\!-}CH_2\\ \|\quad\quad\quad\|\quad\;\|\quad\quad\quad\;\|\quad\quad\quad\;\|\quad\quad\quad\;\|\quad\quad\quad\|\\ O{=}C\quad\quad CH-C-NHNH-C-CH_2-(S)-CH_2-C-NHNH-C-HC\quad\quad C{=}O\\ \diagdown N\diagup\quad\quad\quad\quad\quad\quad\quad\quad\quad\quad\quad\quad\quad\quad\quad\quad\quad\quad\quad\quad\quad\quad\quad\quad\quad\quad\diagdown N\diagup\\ \;\;\;H\quad\quad\quad\quad\quad\quad\quad\quad\quad\quad\quad\quad\quad\quad\quad\quad\quad\quad\quad\quad\quad\quad\quad\quad\quad\quad\quad\quad\quad\;H\end{array}$ | | | 0.2 | 2,200 |

TABLE II.—Continued

| Example number | Compound | Polyols, parts | | | Induction time (hrs.) |
|---|---|---|---|---|---|
| | | Pentaerythritol | Dipentaerythritol | Trimethylol propane | |
| 42 | [structure: pyrrolidinedione with -C-NHNHCH₂-phenol-OH] | 0.2 | | | 2,150 |
| 43 | [structure: imidazole with -C-NH-C- linked to triazole] | 0.2 | | | 2,400 |
| 44 | [structure: imidazole with -CH-CO-NH / CH₂CO-NH] | | 0.2 | | 1,950 |
| 45 | Same as above | | | 0.2 | 1,900 |
| 46 | [structure: imidazole with -CH-C-NHNH₂ / CH₂-C-O C₁₈H₃₇ and/or imidazole with -CH-C-O C₁₈H₃₇ / CH₂-C-NHNH₂] | 0.2 | | | 1,500 |
| 47 | [structure: bis-imidazole fused system] | 0.2 | | | 1,950 |
| 48 | Same as above | | 0.2 | | 1,900 |
| 49 | [structure: bis-benzimidazole dione] | 0.2 | | | 2,000 |
| 50 | Same as above | | | 0.2 | 2,000 |
| 51 | [structure: (pyrrolidinedione-CH-C-NHNH-C-CH₂S-)₂CH₂] | | 0.2 | | 1,950 |
| 52 | Same as above | | | 0.2 | 2,050 |

The improvement due to the polyol is evidenced by the data.

EXAMPLES 53–64

The procedure described in Examples 1 to 34 was repeated with the exception that 0.2 part of an oxy-acid namely, malic acid, tartaric acid or citric acid was incorporated in the samples.

Table III below set out the results of the test.

TABLE III

| Example number | Compound | Oxy-acid, parts | | | Induction Time (hrs.) |
|---|---|---|---|---|---|
| | | Malic acid | Tartaric acid | Citric acid | |
| Control: | | | | | |
| A (no copper) | None | | | | 1,200 |
| B | do | | | | <20 |
| C | Oxanilide | | | | 300 |
| G | None | 0.2 | | | <20 |
| H | do | | 0.2 | | <20 |
| J | do | | | | <20 |

TABLE III.—Continued

| Example number | Compound | Oxy-acid, parts | | | Induction Time (hrs.) |
|---|---|---|---|---|---|
| | | Malic acid | Tartaric acid | Citric acid | |
| 53 | 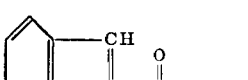 | 0.2 | | | 1,800 |
| 54 | Same as above | | 0.2 | | 1,750 |
| 55 | do | | | 0.2 | 1,750 |
| 56 | 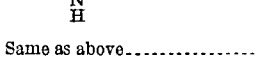 | 0.2 | | | 2,050 |
| 57 | Same as above | | 0.2 | | 2,050 |
| 58 | 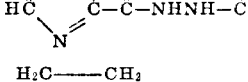 | 0.2 | | | 2,350 |
| 59 | 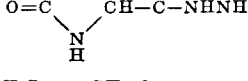 | | 0.2 | | 2,300 |
| 60 | 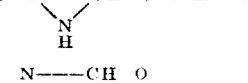 | 0.2 | | | 1,750 |
| 61 | 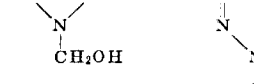 | | | 0.2 | 1,900 |
| 62 | 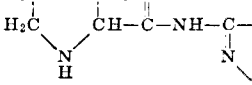 | | 0.2 | | 2,100 |
| 63 | 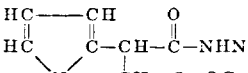 | 0.2 | | | 1,550 |
| 64 | 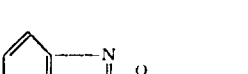 | | | 0.2 | 2,100 |

The improvement due to the oxy-acid is evident.

EXAMPLES 65 TO 76

Polypropylene compositions were prepared, stabilized by a combination of one of the compounds of the invention and a known polypropylene stabilizer, and were evaluated for their resistance to oxidative degradation in the presence of copper.

The base olefin polymer composition tested was as follows:

| | Parts by weight |
|---|---|
| Polypropylene (Profax 6501) | 100 |
| 1,1,3, - tri(2'-methyl-4'-hydroxy-5'-tertbutylphenyl) butane | 1.0 |
| Distearyl thiodipropionate | 0.1 |
| Trinonylphenyl phosphite | 0.1 |
| Copper powder | 1.0 |

0.5 part of the compound listed in Table IV and 0.2 part butylepoxy stearate were also added.

The components listed were mixed on a two roll mill and sheeted off to form 0.5 mm. sheets.

The test procedure employed in Examples 1 to 34 was repeated.

As Control L, a sample containing 0.5 part 3-amino 1,2,4-triazole was tested.

Table IV below sets out the results of the test.

TABLE IV

| Example number | Compound | Induction time (hours) |
|---|---|---|
| Control: | | |
| A (no copper) | None | 1,200 |
| K | do | <20 |
| L | Aminotriazole | 600 |
| 65 | [imidazole-C(O)-NHNH$_2$ structure] | 2,050 |
| 66 | [thiazole-C(O)-NHNH$_2$ structure] | 2,200 |
| 67 | [imidazole-C(O)-NHNH$_2$ structure] | 2,000 |
| 68 | [pyrrolidinone-C(O)-NHNH-phenyl structure] | 1,900 |
| 69 | [bis-indolinone thiosemicarbazide structure] | 1,950 |
| 70 | [bis-pyrrolidinone with -NHNH-C(O)-C$_2$H$_4$-S-C$_2$H$_4$-C(O)-NH-NH- linker] | 2,250 |
| 71 | [thiazole-C(O)-NHN=CH-phenyl structure] | 1,600 |
| 72 | [pyrrolidinone-C(O)-NH-triazole structure] | 2,400 |
| 73 | [bis-imidazole with CH$_2$OH substituents, -NH-C- linker] | 1,800 |
| 74 | [imidazole-C(=CH-CO-NH)-CH$_2$-CO-NH structure] | 1,850 |
| 75 | [bis-imidazole with C(O)-C(O) linker] | 1,900 |
| 76 | $\left(\text{[pyrrolidinone-C(O)-NHNH-C(O)-CH}_2\text{S-]-CH}_2\right)_2$ | 1,900 |

The improvement due to the epoxy compound is evident.

EXAMPLES 77 to 87

Polypropylene compositions were prepared, stabilized by combinations of compounds of the invention and known polypropylene stabilizers, and were evaluated for their resistance to oxidative degradation in the presence of copper.

The base olefin polymer composition tested was as follows:

| | Parts by weight |
|---|---|
| Polypropylene (Profax 6501) | 100 |
| 1,1,3 - tris(2' - methyl-4'-hydroxy-5'-tert-butylphenyl)butane | 0.03 |
| Distearyl thiodipropionate | 0.17 |
| Copper distearate | 0.1 |

To each sample there was also added 0.5 part of the compounds listed in Table V.

The components listed were mixed on a two roll mill and sheeted off to form 0.5 mm. sheets.

The test procedure described in Examples 1 to 34 was employed herein.

TABLE V

| Example number | Compound | Induction time (hours) |
|---|---|---|
| Control: | | |
| M (no copper) | None | 800 |
| N | do | <17 |
| O | Aminotriazole | 103 |
| P | Ozanilide | 78 |
| 77 | 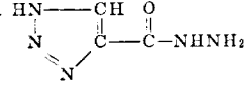 | 1,350 |
| 78 | 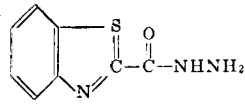 | 1,450 |
| 79 | 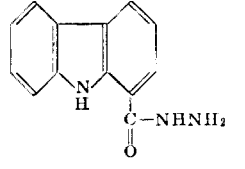 | 1,100 |
| 80 | 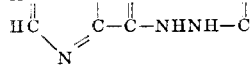 | 1,150 |
| 81 | 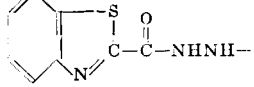 | 1,600 |
| 82 | 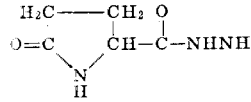 | 1,600 |
| 83 | 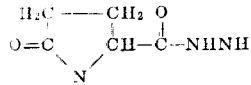 | 1,050 |
| 84 | 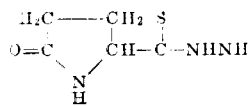 | 1,300 |
| 85 | 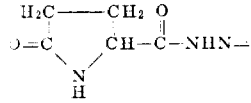 | 1,050 |
| 86 | 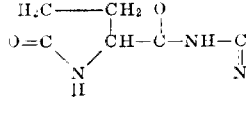 | 1,500 |

TABLE V—Continued

| Example number | Compound | Induction time (hours) |
|---|---|---|
| 87 | HC—CH, HC=C(NH)—CH(CH₂—C(=O)—OC₁₈H₃₇)—C(=O)—NHNH₂ and/or HC—CH, HC=C(NH)—CH(CH₂—C(=O)—NHNH₂)—C(=O)—OC₁₈H₃₇ | 950 |

The improvement in resistance of the polypropylene to oxidative degradation is evident.

EXAMPLES 88 TO 99

Polypropylene compositions were prepared, especially formulated for use in contact with copper, by the incorporation in polypropylene (100 parts) 0.5 part of one of the compounds of the invention. Such compositions can be marketed as such, and when mixed with polypropylene stabilizers will have an enhanced resistance to copper-catalyzed degradation in physical properties.

The powdered polypropylene and copper deactivator were blended in a mixer and were ready for marketing as such.

The polypropylene compositions thus prepared were stabililized by incorporation of a stabilizer system recommended for use with the compounds of the invention. One hundred parts of polypropylene composition was blended with 0.03 part 1,1,3-tri(2'-methyl-4'-hydroxy-5'-tert-butylphenyl) butane, 0.17 part distearyl thiodipropionate, 0.2 part of a borate ester as listed in Table VI, and 0.1 part copper distearate, after which the composition was fluxed for five minutes and sheeted off to form 0.5 mm. sheets.

Table VI below sets out the results of the test.

TABLE VI

| Example number | Compound | Borate ester, parts | | | Induction time (hours) |
| | | Phenyl lauryl borate | Tristearyl borate | 2,6-di-t-butyl-4-methylphenylborate | |
|---|---|---|---|---|---|
| Control: | | | | | |
| Q | None | | | | <17 |
| R | Aminotriazole | | | | 103 |
| S | None | | | | <17 |
| T | do | | 0.2 | | <17 |
| U | do | | | 0.2 | <17 |
| 88 | HN—CH, N=C(—C(=O)—NHNH₂)—N (triazole carbohydrazide) | 0.2 | | | 1,550 |
| 89 | Same as above | | 0.2 | | 1,450 |
| 90 | do | | | 0.2 | 1,600 |
| 91 | Carbazole-C(=O)—NHNH₂ | 2.0 | | | 1,350 |
| 92 | Same as above | | | 0.2 | 1,400 |
| 93 | Benzothiazole-C(=O)—C(=O)—NHNH—C(=O)—NHNH—C(=O)—C(=O)-benzothiazole | | 0.2 | | 1,650 |
| 94 | Same as above | | | 0.2 | 1,850 |
| 95 | H₂C—CH₂, O=C(—NH—)CH—C(=O)—NHNH—C(=O)—CH₂—C(=O)—CH₃ | | 0.2 | | 1,300 |
| 96 | Same as above | | | 0.2 | 1,350 |
| 97 | H₂C—CH₂, O=C(—NH—)CH—C(=S)—NHNH₂ | | 0.2 | | 1,450 |

TABLE VI—Continued

| Example number | Compound | Borate ester, parts | | | Induction time (hours) |
|---|---|---|---|---|---|
| | | Phenyl lauryl borate | Tristearyl borate | 2,6-di-t-butyl-4-methylphenylborate | |
| 98 | (hydantoin-type compound with aziridine) | 0.2 | | | 1,600 |
| 99 | Same as above | | | 0.2 | 1,800 |

The improvement in resistance of the polypropylene to oxidative degradation due to the borate ester is evident.

EXAMPLES 100 TO 108

Polypropylene compositions were prepared, stabilized by combinations of compounds of the invention and known polypropylene stabilizers, and were evaluated for their resistance to oxidative degradation in the presence of copper.

The base olefin polymer composition tested was as follows:

| | Parts by weight |
|---|---|
| Polypropylene (Profax 6501) | 100 |
| Distearyl thiodipropionate | 0.17 |
| 1,1,3 - tris(2'-methyl-4'-hydroxy-5'-tert-butylphenyl)butane | 0.03 |

To each sample there was also added 0.5 part of one of the compounds listed in Table VII.

The components listed were mixed on a two roll mill and sheeted off to form 0.5 mm. sheets. Pieces cut from the sheets were sandwiched between two copper plates each 10 mils thick.

The samples were tested at 160° C. employing a similar procedure of Examples 1 to 34.

Table VII belows sets out the results of the test.

TABLE VII

| Example number | Compound | Induction time (hours) |
|---|---|---|
| Control: | | |
| W | None | <20 |
| X | Oxanilide | 81 |
| 100 | (benzimidazole-C(O)-NHNH₂) | 145 |
| 101 | (hydantoin-C(O)-NHNH₂) | 170 |
| 102 | (hydantoin-C(O)-NHNH-phenyl) | 155 |
| 103 | (bis-hydantoin linked through -NHNH-C(O)-CH₂-(S)-CH₂-C(O)-NHNH-) | 200 |
| 104 | (bis-hydantoin linked through -NHNH-C(O)-C₂H₄-S-C₂H₄-C(O)-NH-NH-) | 180 |
| 105 | (hydantoin-C(O)-NHNH-C(O)-CH₂-C(O)-CH₃) | 145 |
| 106 | (thiazolidine-C(O)-NHN=CH-phenyl) | 130 |
| 107 | (thiazolidine-C(O)-NH-C(imidazoline)) | 150 |

TABLE VII—Continued

| Example number | Compound | Induction time (hours) |
|---|---|---|
| 108 | 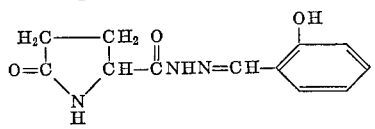 | 140 |

The improvement in resistance of the polypropylene to oxidative degradation is evident.

The following examples illustrate preferred embodiments of the procedure for preparing heterocyclic hydrazines and lactams of the invention.

EXAMPLE A 35.2 g. (0.55 mole) of 80% hydrated hydrazine was dissolved in 75 ml. ethanol and heated to 40° C. 78.5 g. (0.5 mole) di-ethyl-2-pyrrolidone-5-carboxylate was added and the mixture heated for 5 hours. The ethanol, water and some unreacted hydrazine were removed at reduced pressure. The product was a solid which was subjected to infra-red (IR) analysis. The IR spectra corresponded to that expected for 2-pyrrolidone-5-carboxylic acid hydrazide.

EXAMPLE B 75.5 g. (0.55 mole) of 2-pyrrolidone-5-carboxylic acid hydrazide prepared as in Example A was reacted with 61 g. (0.5 mole) salicylaldehyde and the water formed during the condensation was removed. The product was a solid having a melting point between 186–195° C. and an IR spectra corresponding to the following structure

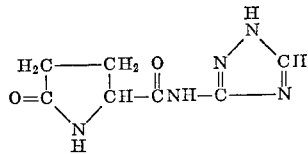

EXAMPLE C 46.3 g. (0.55 mole) of 3-amine-triazole was reacted with 125.1 g. of p-nitrophenyl-2-pyrrolidone-5-carboxylate in a manner similar to Example A. The solid product had a melting point of 234° C. and the structure

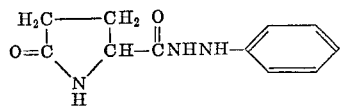

EXAMPLE D 59. g. (0.55 mole) phenyl hydrazine was reacted with 102.6 g. (0.5 mole) of phenyl 2-pyrrolidone-5-carboxylate in a manner similar to Example A. The product was a brown high melting solid whose IR spectra conformed to the formula $$H_2C\text{---}CH_2\quad O$$
$$O=C\quad CH\text{---}CNHNH\text{---}\langle\text{phenyl}\rangle$$
$$\diagdown N\diagup$$
$$H$$

EXAMPLE E 14.3 g. of ethyl-pyrrolidine-2-carboxylate was dissolved in 70 ml. of ethanol containing 6.0 g. of 80% hydrazine hydrate. The solution was stirred at 40° C. for 2 hours and then the solvent evaporated. A solidified product formed which was treated with water and dried in a vacuum oven at 80° C. This yielded 20.6 g. of solid material at 122–124° C. and having an IR spectra corresponding to the structure

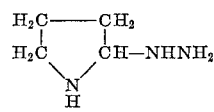

EXAMPLE F 19 g. of ethyl benzimidazole-2-carboxylate was dissolved in 199 ml. of ethanol containing 6.0 g. of 80% hydrazine hydrate. The solution was refluxed and then the solvent evaporated. A solidified product formed which was treated with water and dried in a vacuum oven at 80° C. This yielded 13.7 g. of solid material melting at 186–188° C. and having an IR spectra corresponding to the structure

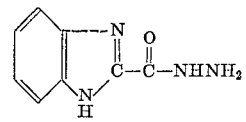

EXAMPLE G 15.7 g. of di-ethyl-2-pyrrolidone-5-carboxylate was dissolved in 70 cc. of ethanol containing 6.0 g. of 80% hydrazine hydrate. The solution was stirred at 40° C. for 2 hrs. and then allowed to stand at room temperature. The product was filtered off, then washed with ethanol and ether, and dried. This yielded 11.4 g. of solid material melting at 148° C. and having an IR spectra corresponding to the structure

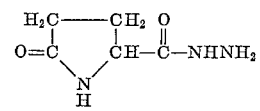

EXAMPLE H

A mixture of 4.7 g. of ethyl-2-pyrrolidone-5-carboxylate and 3.6 g. of phenyl hydrazine was stirred at 90° C. for 10 hrs. in 10 cc. water and then the solvent was evaporated therefrom. The solidified product was treated with acetone and dried. This yielded 2.2 g. of material melting at 152–154° C. and having an IR spectra corresponding to the structure

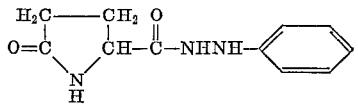

EXAMPLE J 19.3 g. of benzothiazole-2-carboxyl hydrazine was dissolved in 100 cc. of 95% ethanol containing 18 cc. of 20% potassium hydroxide aqueous solution and then 3.8 g. of carbon disulfide added. The mixture was refluxed for 5 hrs. and the solvent evaporated. The solidified product was treated with water and dried in a vacuum oven at 80° C. This yielded 11.6 g. of solid material decomposing at higher than 230° C. and having an IR spectra corresponding to the structure

EXAMPLE K

A mixture of 16.5 g. of phenyl thiodipropionate and 14.3 g. of 2-pyrrolidone-5-carbonyl hydrazine was stirred at 100° C. A solidified product was formed which was treated with benzene and filtered off, and dried. This yielded 12.4 g. of solid material melting at 232–235° C. and having an IR spectra corresponding to the structure

EXAMPLE L

A mixture of 14.3 g. of 2-pyrrolidone-5-carbonyl hydrazine and 12.1 g. of salicylaldehyde was dissolved in 100 cc. of ethanol. The solution was refluxed for one hour. A solid product was filtered off, washed with water and dried in a vacuum oven at 80° C. This yielded 22.4 g. of solid material melting at 180–190° C. and having an IR spectra corresponding to the structure

EXAMPLE M

A mixture of 20.5 g. of phenyl thiazole-4-carboxylate and 8.4 g. of 3-amino-1,2,4-triazole was dissolved in propylene glycol. The solution was heated at 120° C. A solid product formed which was filtered off, washed with ethanol and dried. This yielded 14.7 g. of solid material melting at 182–185° C. and having an IR spectra corresponding to the structure

EXAMPLE N 23.9 g. of diethyl-pyrrole-2-succinate was dissolved in 70 cc. of ethanol containing 3.0 g. of 80% hydrazine hydrate. The solution was refluxed for 2 hrs. and then allowed to stand at room temperature. Solids were filtered, washed with ethanol and dried in a vacuum oven at 60° C. This yielded 17.2 g. of solid material melting at 230–235° C. and having an IR spectra corresponding to the structure

EXAMPLE O 64.6 g. of 2-pyyrolidone-5-carboxylic acid and 56.4 g. of phenol were mixed with 130 g. of xylene solvent, and 30.7 g. of phosphorus oxychloride was added slowly. The mixture was heated at 100° C. for 2 hours. A precipitate formed which was filtered and washed with acetone. This yielded a product having an IR spectra corresponding to the structure

EXAMPLE P

A mixture of 14.3 g. of 2-pyrrolidone-5-carbonyl hydrazine and 9.2 g. of thioglycolic acid p-nitrophenyl ester was heated at 90° C. for 6 hrs. The product was treated with benzene and then filtered off and dried. The IR spectra of the product corresponded to the following structure

EXAMPLE Q

A mixture of 14.3 g. of phenyl acetoacetate and 17.8 g. of 2-pyrrolidone-5-carbonyl hydrazine was stirred at 100° C. for 4 hours. The product was treated with benzene and then filtered off, and dried. The IR spectra of the product corresponded to the structure

EXAMPLE R

To 16.1 g. of 2-pyrrolidone-5-carboxylic dithioacid in 80 cc. of diethylene glycol dimethyl ether was slowly added 6.0 g. of 80% hydrazine hydrate. The mixture was stirred at 60° C. for 4 hrs. The product was filtered off, washed with ethanol and ether and dried. The IR spectra of the product corresponded to the structure

EXAMPLE S

A mixture of 19.2 g. of phenyl-1,3-diazole-4-carboxylate and 8.4 g. of 3-amino-1,2,4-triazole was dissolved in propylene glycol. The solution was heated at 120° C. and a solid precipitate formed which was filtered off, washed with ethanol and dried. This yielded a solid product having an IR spectra corresponding to the structure

EXAMPLE T

A mixture of 17.8 g. of the product of Example S and 6.0 g. of paraformaldehyde in 50 cc. of ethanol containing 1 g. of sodium hydroxide was stirred at room temperature for half an hour. A precipitate formed which was filtered off, washed with ethanol and ether, and dried. The IR spectra of the product corresponded to the structure

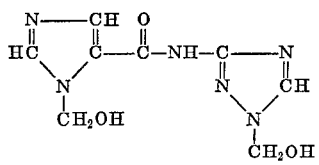

EXAMPLE U 23.2 g. of ethyl stearyl-pyrrole-2-succinate was dissolved in 70 cc. of ethanol containing 3.0 g. of hydrazine hydrate aqueous solution. The solution was stirred at room temperature for 4 hours. A precipitate formed which was filtered, washed with ethanol and dried in a vacuum oven at 60° C. The IR spectra of the product corresponded to the structure

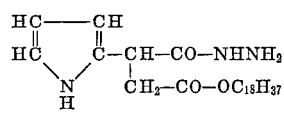

and/or

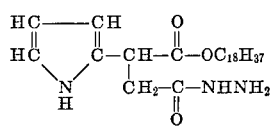

which corresponds to the compounds of Examples 31, 46 and 87.

EXAMPLE V

A mixture of 14.3 g. of 2-pyrrolidone-5-carbonyl-hydrazine and 17.4 g. of diphenyl methylene bis thioglycolate was heated at 120° C. A solid formed which was treated with benzene and then filtered and dried. The IR spectra of the solid corresponded to the structure

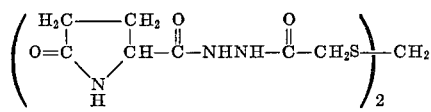

Having regard to the foregoing disclosure, the following is claimed as the inventive and patentable embodiments thereof:

1. A stabilizer combination useful in the enhancement of the resistance of olefin polymer sto copper-catalyzed oxidative deterioration, consisting essentially of an amount to provide from about 0.05 to about 4% by weight in the olefin polymer of at least one heterocyclic hydrazine or lactam having the formula:

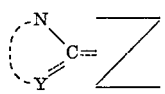

wherein

represents a heterocyclic ring structure which includes at least one five or six membered ring, in which the ring atoms are selected from nitrogen, carbon, and Y, and Y is selected from the group consisting of nitrogen, carbon or sulfur, and which is selected from the group consisting of pyrrole, pyridine, pyrrolizine, pyrrolidone, pyrrolone, pyrazine, quinoline, triazole, imidazole, tetrazole, imidazoline, imidazolidine, imidazolone, benzoimidazole, benzoimidazolone, pyrazole, pyrazolone, indazole, thiazole, pyridazine, pyrimidine, quinolizine, piperazine, triazine, tetrazine, indole, indoline, benzothiazole, benzopyrazole, indolenine, and isothiazole; and

is selected from the group consisting of (1) 

$R_1$ is selected from the group consisting of hydrogen, alkyl having from one to about eighteen carbon atoms, aryl and

wherein $R_2$ is selected from the group consisting of $R_3$, $HSR_4$—,

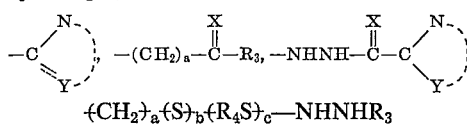

and

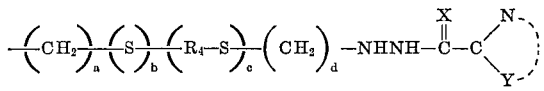

wherein
$R_3$ is an alkyl having from one to about eighteen carbon atoms,
$R_4$ is an alkylene having from one to six carbon atoms or arylene,
$a$, $b$ and $d$ are 0, 1 or 2.
$c$ is 0 or 1;

(2) 

$R_5$ is

or —N=CHR, wherein $R_6$ is selected from the group consisting of $R_3$,

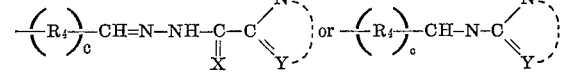

(3) 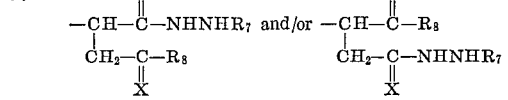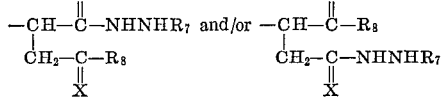

wherein
$R_8$ is selected from the group consisting of aryloxy, alkoxy or

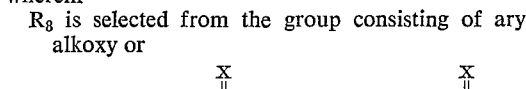

can form a ring

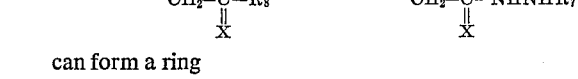

or

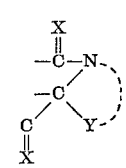

$R_7$ is selected from the group consisting of hydrogen or $R_3$ and

X in each of the above formulae is selected from the group consisting of oxygen and sulfur; and at least one olefin polymer stabilizer in an amount to provide from about 0.001% to about 4% by weight, in the olefin polymer, and selected from the group consisting of phenols, thiodipropionic acid esters, polyvalent metal salts, organic phosphites, hydrocarbon sulfides and polysulfides, and mixtures thereof, the stabilizer being compatible with polypropylene and having a low vapor pressure at olefin polymer working temperatures.

2. A stabilizer combination in accordance with claim 1 wherein the olefin polymer stabilizer is a phenol.

3. A stabilizer combination in accordance with claim 1 wherein the olefin polymer stabilizer is a thiodipropionic acid ester.

4. A stabilizer combination in accordance with claim 1 wherein the olefin polymer stabilizer is a combination consisting essentially of a phenol in an amount to provide from about 0.025 to about 0.5% by weight in the olefin polymer, and a thiodipropionic acid ester in an amount to provide from about 0.05% to about 1% by weight in the olefin polymer.

5. A stabilizer combination in accordance with claim 1 including on organic phosphite.

6. A stabilizer combination in accordance with claim 3 including an organic phosphite in an amount to provide from about 0.05 to about 1.25 by weight of the olefin polymer, the thiodipropionic acid ester being in an amount to provide from about 0.05 to about 1% by weight, in the olefin polymer.

7. Olefin polymer compositions having an enhanced resistance to heat degradation and to copper-catalyzed degradation in physical properties, consisting essentially of an olefin polymer, an amount within the range from about 0.001 to about 4% by weight of the olefin polymer of at least one olefin polymer stabilizer selected from the group consisting of phenols, thiodipropionic acid esters, organic phosphites and hydrocarbon sulfides and polysulfides, polyvalent metal salts, and mixtures thereof, and an amount within the range from about 0.05 to about 4% by weight of the olefin polymer of at least one heterocyclic hydrazine or lactam having the formula:

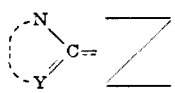

wherein

represents a heterocyclic ring structure which includes at least one five or six membered ring, in which the ring atoms are selected from nitrogen, carbon and Y, and Y is selected from the group consisting of nitrogen, carbon or sulfur and which is selected from the group consisting of pyrrole, pyridine, pyrrolizine, pyrrolidone, pyrroione, quinoline, triazole, imidazole, tetrazole, imidazoline, imidazolidine, imidazolone, benzoimidazole, benzoimidazolone, pyrazole, pyrazolone, indazole, thiazole, pyridazine, pyrimidine, quinolizine, pyrazine, piperazine, triazine, tetrazine, indole, indoline, benzothiazole, benzopyrazole, indolenine, and isothiazole; and Z is selected from the group consisting of (1) 

$R_1$ is selected from the group consisting of hydrogen, alkyl having from one to about eighteen carbon atoms, aryl and

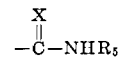

wherein $R_2$ is selected from the group consisting of $R_3$, $HSR_4$—,

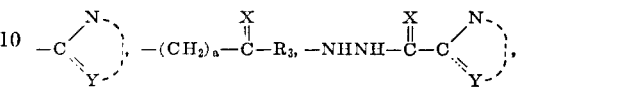

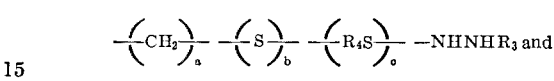

wherein $R_3$ is an alkyl having from one to about eighteen carbon atoms, $R_4$ is alkylene having from one to six carbon atoms or arylene, $a$, $b$ and $d$ are 0, 1 or 2, $c$ is 0 or 1;

(2)

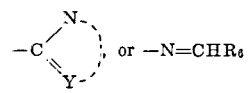

$R_5$ is

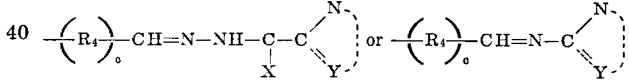

wherein $R_6$ is selected from the group consisting of $R_3$,

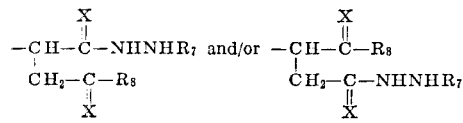

(3)

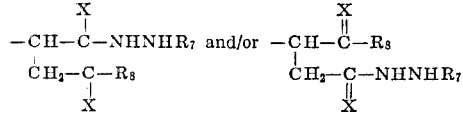

wherein $R_8$ is selected from the group consisting of aryloxy, alkoxy or —$NHNHR_7$, and

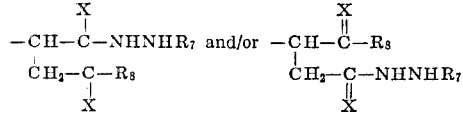

can form a ring

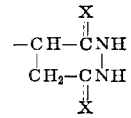

or

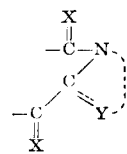

$R_7$ is selected from the group consisting of hydrogen or $R_3$ and X in each of the above formulae is selected from the group consisting of oxygen and sulfur.

8. An olefin polymer composition in accordance with claim 7 wherein the olefin polymer is a propylene polymer.

9. An olefin polymer composition in accordance with claim 8 wherein the propylene polymer is polypropylene.

10. An olefin polymer composition in accordance with claim 7, wherein the olefin polymer stabilizer is a phenol in an amount within the range from about 0.025 to about 0.5% by weight of the olefin polymer.

11. An olefin polymer composition in accordance with claim 7, wherein the olefin polymer stabilizer is a thiodipropionic acid ester in an amount within the range from about 0.05 to about 1% by weight of the olefin polymer.

12. An olefin polymer composition in accordance with claim 7 wherein the olefin polymer stabilizer is a combination of an amount within the range from about 0.025 to about 0.5% of a phenol and an amount within the range from about 0.05 to about 1% of a thiodipropionic acid ester by weight of the olefin polymer.

13. An olefin polymer composition in accordance with claim 7 wherein the olefin polymer stabilizer is a combination of an amount within the range from about 0.025 to about 0.5% of a phenol, an amount within the range from about 0.05 to about 1% of a thiodipropionic acid ester, and an amount within the range from about 0.5 to about 1.25% of an organic phosphite by weight of the olefin polymer.

14. An olefin polymer composition in accordance with claim 7 wherein the olefin polymer stabilizer is a combination of an amount within the range from about 0.025 to about 0.5% of a phenol, an amount within the range from about 0.05 to about 1% of a thiodipropionic acid ester, an amount within the range from about 0.05 to about 1.25% of an organic phosphite and an amount within the range from about 0.025 to about 0.75% of a polyvalent metal salt of an organic acid by weight of the olefin polymer.

References Cited

UNITED STATES PATENTS

| | | | |
|---|---|---|---|
| 3,296,188 | 1/1967 | Leu | 260—45.8 |
| 3,309,337 | 3/1967 | Hurlock et al. | 260—41 |
| 3,357,944 | 12/1967 | Dexter | 260—45.9 |
| 3,367,907 | 2/1968 | Hansen | 260—45.8 |

DONALD E. CZAJA, Primary Examiner

R. A. WHITE, Assistant Examiner

U.S. Cl. X.R.

117—232; 252—400, 402, 403, 404, 406; 260—45.7 P, 45.7 S, 45.75 R, 45.8 N, 45.8 SN, 45.85, 45.95

UNITED STATES PATENT OFFICE
CERTIFICATE OF CORRECTION

Patent No. 3,629,189　　　　　　　　　Dated December 21, 1971

Inventor(s) Motonobu Minagawa　　　　　　Page 1 of 3

It is certified that error appears in the above-identified patent and that said Letters Patent are hereby corrected as shown below:

| | | |
|---|---|---|
| Column 1, line 40 | : | "elefin" should be --olefin-- |
| Column 11, line 16 | : | insert --and-- before "phenyl" |
| Column 11, line 38 | : | "butylidenebis" should be --butylidene-bis-- |
| Column 11, line 42 | : | "mthyl" should be --methyl-- |
| Column 11, line 48 | : | "tetra-tridecyl" should be --tetra -n-dodecyl-- |
| Column 14, line 8 | : | "$R_1[OCCH_2CH_2SCH_2CH_2COOX-O]_n$" should be --$R_1O[OCCH_2CH_2SCH_2CH_2COOX-O]_n$ -- |

Column 21-22, No. 24:

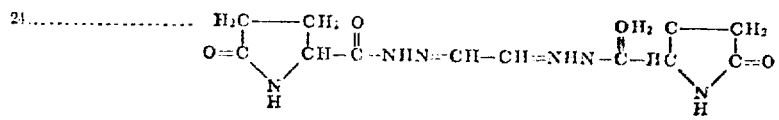

should be

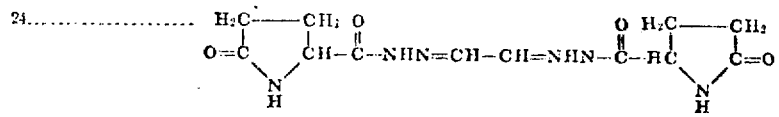

Column 26, No. 52　:

0.2 .................... 2,05_0 should be 0.2 .................... 2,050

UNITED STATES PATENT OFFICE
CERTIFICATE OF CORRECTION

Patent No. 3,629,189    Dated December 21, 1971

Inventor(s) Motonobu Minagawa

It is certified that error appears in the above-identified patent and that said Letters Patent are hereby corrected as shown below:

Column 27-28 No. 60 :

should be

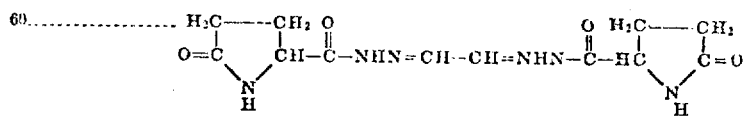

Column 33, No. 95 :

| Borate ester, parts | | | |
|---|---|---|---|
| Phenyl lauryl borate | Tri-stearyl borate | 2,6-di-t-butyl-4-methylphen-ylborate | Induction time (hours) |
| | | 0.2 | 1,300 | should be

| Borate ester, parts | | | |
|---|---|---|---|
| Phenyl lauryl borate | Tri-stearyl borate | 2,6-di-t-butyl-4-methylphen-ylborate | Induction time (hours) |
| 0.2 | | | 1,300 |

UNITED STATES PATENT OFFICE
CERTIFICATE OF CORRECTION

Patent No. 3,629,189　　　　　　　　　　Dated December 21, 1971

Inventor(s) Motonobu Minagawa

It is certified that error appears in the above-identified patent and that said Letters Patent are hereby corrected as shown below:

Column 37, line 27　　:　"someunreacted" should be -- some unreacted--

Column 41, line 50　　:　"sto" should be --to--

Column 42, line 44　　:　"—N═CHR" should be -- —N═CHR$_6$--

Column 42, line 75　　:　
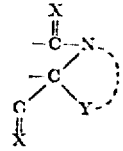

should be

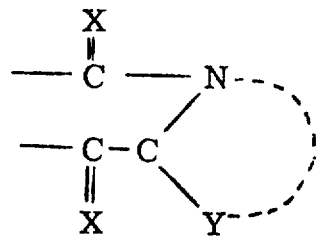

Column 43, line 27　　:　"on " should be --in--

Signed and Sealed this

Third Day of August 1976

[SEAL]

Attest:

RUTH C. MASON　　　　　　　　　C. MARSHALL DANN
Attesting Officer　　　　　　　Commissioner of Patents and Trademarks